United States Patent
Allwyn et al.

(10) Patent No.: US 7,092,261 B2
(45) Date of Patent: Aug. 15, 2006

(54) SWITCHING POWER SUPPLY UTILIZING OSCILLATOR FREQUENCY TUNER FOR LOAD DRIVING CAPABILITY UNDER PEAK LOAD CONDITION

(75) Inventors: Jacob D'Cunha Allwyn, Samutprakarn (TH); Kumar Tandon Rupesh, Samutprakarn (TH); Ittasakul Supaporn, Samutprakarn (TH); Kuei Hsiang Tasi, Taoyuan Hsien (TW)

(73) Assignees: Delta Electronics, Inc., Taoyuan Hsien (TW); Delta Electronics (Thailand) Public Company, Limited, Samutprakarn (TH)

( * ) Notice: Subject to any disclaimer, the term of this patent is extended or adjusted under 35 U.S.C. 154(b) by 104 days.

(21) Appl. No.: 10/850,696

(22) Filed: May 21, 2004

(65) Prior Publication Data

US 2005/0141251 A1    Jun. 30, 2005

(30) Foreign Application Priority Data

Dec. 31, 2003    (TW)    ............................... 92137772 A

(51) Int. Cl.
*H02M 3/335* (2006.01)

(52) U.S. Cl. .................................. 363/21.18; 363/21.17

(58) Field of Classification Search ............. 363/12.18, 363/21.17, 21.12, 131
See application file for complete search history.

(56) References Cited

U.S. PATENT DOCUMENTS

| 4,975,823 A | * | 12/1990 | Rilly et al. | ............... 363/21.16 |
| 6,850,422 B1 | * | 2/2005 | Strijker | .................... 363/21.01 |

* cited by examiner

*Primary Examiner*—Shawn Riley
(74) *Attorney, Agent, or Firm*—Madson & Austin

(57) ABSTRACT

A switching power supply including an oscillator frequency tuner to enhance its load driving capability is presented. The oscillator frequency tuner includes a plurality of capacitors connected between a reference voltage output of the switching control circuit and a ground terminal, at least one bypass switch coupled across at least one of the capacitors for controlling the charging and discharging operation of the capacitor coupled therewith, and a bypass switch controller for controlling a switching state of the bypass switch. When the switching power supply is operating under a peak load condition, the bypass switch controller receives a feedback control signal and instructs the bypass switch to bypass current, and thus reducing the equivalent timing capacitance of the switching control circuit for increasing the maximum duty cycle of the switching control circuit.

14 Claims, 8 Drawing Sheets

Input Power / Input Current / Efficiency Test

| Input voltage (Vac) | Iin rms (A) | Pin (W) | Pout (W) | Dissipated Power(W) | Efficiency (%) | Power Factor |
|---|---|---|---|---|---|---|
| 88 | 0.8998 | 48.4 | 40.53 | 7.87 | 83.739 | 0.610 |
| 269 | 0.3702 | 47.6 | 40.55 | 7.05 | 85.189 | 0.477 |

Fig.5(a)

Load / Line Regulation Test (Constant Load)

| Load(A) | Output Voltage (V) | | | |
|---|---|---|---|---|
| | 88Vac/47Hz | 88Vac/63Hz | 269Vac/47Hz | 269Vac/63Hz |
| 0.030 | 31.346 | 31.306 | 31.298 | 31.266 |
| 1.29 | 31.216 | 31.180 | 31.176 | 31.146 |

Fig.5(b)

Load / Line Regulation Test (Peak Load)

| Vin/freq | Output Voltage (V) | |
|---|---|---|
| | Max. | Min. |
| 88Vac/47Hz | 31.1 | 23.8 |
| 88Vac/63Hz | 31.1 | 24.2 |
| 269Vac/47Hz | 31.1 | 20.2 |
| 269Vac/63Hz | 31.2 | 20.1 |

Fig.5(c)

Input Power / Input Current / Efficiency Test

| Input voltage (Vac) | Iin rms (A) | Pin (W) | Pout (W) | Dissipated Power(W) | Efficiency (%) | Power Factor |
|---|---|---|---|---|---|---|
| 88 | 0.8743 | 48.3 | 40.13 | 8.17 | 83.084 | 0.627 |
| 269 | 0.3557 | 47.6 | 40.12 | 7.48 | 84.285 | 0.496 |

Fig.6(a)

Load / Line Regulation Test (Constant Load)

| Load(A) | Output Voltage (V) | | | |
|---|---|---|---|---|
| | 88Vac/47Hz | 88Vac/63Hz | 269Vac/47Hz | 269Vac/63Hz |
| 0.030 | 31.162 | 31.176 | 31.136 | 31.158 |
| 1.29 | 31.010 | 31.004 | 30.976 | 30.982 |

Fig.6(b)

Load / Line Regulation Test (Peak Load)

| Vin/freq | Output Voltage (V) | |
|---|---|---|
| | Max. | Min. |
| 88Vac/47Hz | 31.1 | 26.9 |
| 88Vac/63Hz | 31.1 | 27.8 |
| 269Vac/47Hz | 31.6 | 30.0 |
| 269Vac/63Hz | 31.6 | 29.9 |

Fig.6(c)

SWITCHING POWER SUPPLY UTILIZING OSCILLATOR FREQUENCY TUNER FOR LOAD DRIVING CAPABILITY UNDER PEAK LOAD CONDITION

FIELD OF THE INVENTION

The present invention is related to a switching power supply, and more particularly to a switching power supply that utilizes an oscillator frequency tuner capable of dynamically adapting the oscillator frequency and the maximum duty cycle of a switching control circuit of the switching power supply, and further enhancing the load driving capability of the switching power supply under a peak load condition.

BACKGROUND OF THE INVENTION

A typical representation of a switching power supply is depicted in FIG. 1. In the switching power supply of FIG. 1, a rectifier 11 is used to receive an input AC voltage Vin and convert the input AC voltage Vin into a rectified DC voltage. A switch device 12 is coupled between an output end of the rectifier 11 and the primary winding of a transformer T1. The transformer T1 is provided to receive the rectified DC voltage from its primary winding and acts as an energy storage device to store magnetization energy therein while the switch device 12 is turned on. While the switch device 12 is turned off, the magnetization energy reserved in the primary winding of the transformer T1 is transferred across a secondary winding. An output circuit 13 including a rectifier diode D and a smoothing capacitor C 131 is placed between the secondary winding of the transformer T1 and an output terminal of the switching power supply for providing an output DC voltage Vout scaled according to the turn ratio of the transformer T1 to a load 15. It is to be noted that the output power of the switching power supply contributed by the transferred magnetization energy through the transformer T1 is proportional to the operating frequency of the switch device 12. A feedback loop 14 is coupled to the output terminal of the switching power supply for providing a feedback signal indicating the variation of the output voltage Vout and measuring the value of the current flowing through the load 15. The switching power supply of FIG. 1 further incorporates a switching control circuit 16 that is normally implemented by a pulse-width modulation (PWM) controller. The switching control circuit 16 normally includes an error sampling circuit, an oscillator, and a PWM signal generation circuit, all of which are not shown in the drawings for simplicity. The error sampling circuit generally detects an error between the feedback signal from the feedback loop 14 and a predetermined reference signal for the output to the PWM circuit. The oscillator circuit is used to generate an oscillating frequency signal. The PWM signal generation circuit is used to provide a PWM signal based on the oscillating frequency signal from the oscillator circuit and the feedback control signal from the error sampling circuit for regulating the output voltage Vout of the switching power supply. Thus, the output voltage Vout can be stabilized at a predetermined value.

Generally, the maximum output power of a switching power supply is restrained by the limited pulse width of the PWM signal and thus its load driving capability is generally insufficient. When a conventional switching power supply is used in cooperation with a light load device, it can operate at its maximum duty cycle. However, if the load device is a computer peripheral, for example, a printer, there is a general requirement that the switching power supply operates under a peak load condition, which means the switching power supply required to provide two times or more than two times of the continuous power output. Under this condition, a conventional switching power supply is incompetent to drive the load because the load power has exceeded its maximum load driving capability.

There is a tendency to develop a switching power supply which incorporates an oscillator frequency tuner that is competent to enhance the load driving capability of the switching power supply under peak load condition.

SUMMARY OF THE INVENTION

A first object of the present invention is to provide a switching power supply capable of providing an improved load driving capability under peak load condition.

A second object of the present invention is to provide an oscillator frequency tuner that can enhance the load driving capability of a switching power supply under peak load condition.

To this end, a switching mode power supply is provided and includes a rectifier which receives an input voltage and converts the input voltage into a rectified DC voltage, a switch device connected to the rectifier, a transformer connected to the switch device for transducing the rectified DC voltage into a magnetization energy by a primary winding and transferring the magnetization energy across a secondary winding according to on/off operations of the switch device, a switching control circuit which generates a switching control signal to regulate a duty cycle of the switch device, and an oscillator frequency tuner that modulates an oscillator frequency of the switching control circuit according to a feedback control signal provided by the switching control circuit to broaden a maximum duty cycle of the switching control circuit when the switching power supply is operating under peak load condition.

The oscillator frequency tuner according to an exemplary embodiment of the present invention further comprising a plurality of capacitors connected between a reference voltage output of the switching control circuit and a ground terminal, at least one bypass switch coupled across at least one of the capacitors for controlling the charging and discharging operation of the capacitor coupled therewith, and a bypass switch controller for controlling a switching state of the bypass switch.

Now the foregoing and other features and advantages of the present invention will be best understood through the following descriptions with reference to the accompanying drawings, wherein:

BRIEF DESCRIPTION OF THE DRAWINGS

FIGS. 5(a) to 5(c) are compilations of test result data of a conventional switching power supply without an oscillator frequency tuner; and FIG. 6(a) to 6(c) are compilations of test result data of a switching power supply with an oscillator frequency tuner of the present invention being incorporated therein.

DETAILED DESCRIPTION OF THE PREFERRED EMBODIMENT

An exemplary embodiment embodying the features and advantages of the present invention will be expounded in following paragraphs of descriptions. It is to be realized that the present invention is allowed to have various modification in different respects, all of which are without departing from the scope of the present invention, and the description herein and the drawings are intended to be taken as illustrative in nature, and are not limitative.

Figure 2:
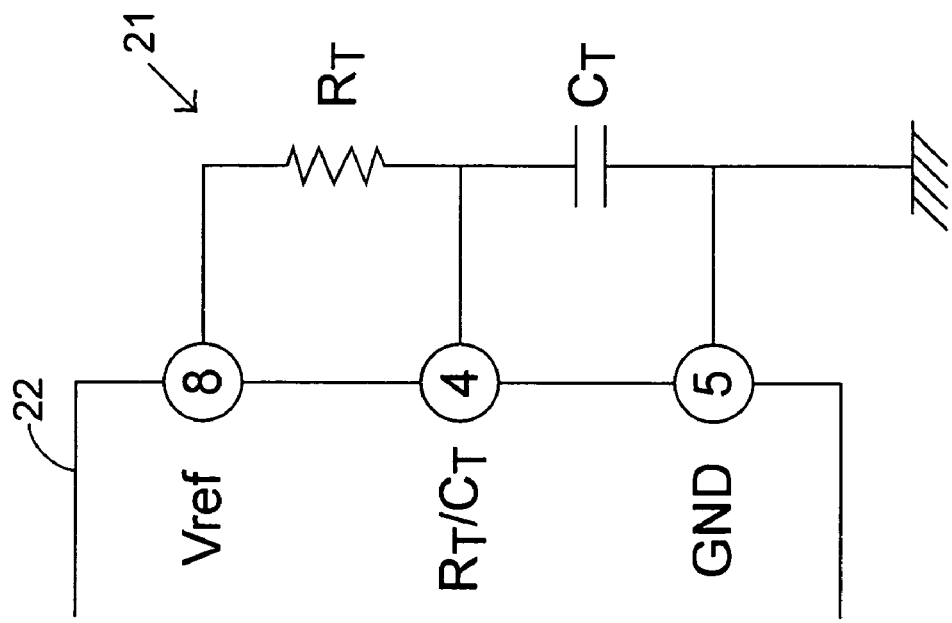
FIG. 2 partially shows a prior art UC3843 current-mode PWM controller combined with a control circuitry.

Referring to FIG. 2, a prior art UC3843 current-mode PWM controller 22 is partially shown in combination of a control circuitry 21. In the exemplary embodiment, the UC3843 PWM controller 22 is to be taken as a standard exemplification as the switching control circuit 16 for use in a switching power supply. In FIG. 2, a resistor $R_T$ and an oscillating timing capacitor $C_T$ form a control circuitry 21 for the PWM controller 22 that are respectively connected between the eighth pin and the fourth pin of the PWM controller 22 and between the fourth pin and the fifth pin of the PWM controller 22. The fifth pin of the PWM controller 22 is connected between the oscillating timing capacitor $C_T$ and ground. With respect to a UC3843 current-mode PWM IC, the eighth pin ($V_{ref}$) is assigned as a reference output terminal that provides a charging current for capacitor $C_T$ through the resistor $R_T$, and the fourth pin ($R_T/C_T$) is provided to the oscillating timing capacitor $C_T$ and resistor $R_T$ for programming the oscillator frequency and maximum output duty cycle of the PWM controller 22. The oscillating timing capacitor $C_T$ is charged by the reference output $V_{ref}$ and discharged by an internal current source of the PWM controller 22. By charging and discharging the oscillating timing capacitor $C_T$, the pulse width and duty cycle of the internal clock signal of the PWM controller 22 can be controlled. The selection of $R_T$ and $C_T$ can therefore determine both the oscillator frequency and the pulse width of the PWM controller 22. The charging time $t_c$ and discharging time $t_d$ of the capacitor $C_T$ are calculated by the following formulas:

$$t_c = 0.55 R_T C_T,$$

$$t_d = R_T C_T I_n\left(\frac{0.0063 R_T - 2.7}{0.0063 R_T - 4}\right)$$

And the oscillator frequency of the PWM controller 22 is $f_{osc} = (t_c + t_d)^{-1}$. For $$R_T > 5K\Omega, f_{osc} = \frac{1.8}{R_T C_T}.$$

Therefore, it can be known by the deduction from the above formulas that the oscillator frequency $f_{osc}$ of the PWM controller 22 is inversely proportional to the resistance of the resistor $R_T$ and the capacitance of the oscillating timing capacitor $C_T$. If the resistance of the resistor $R_T$ or the capacitance of the oscillating timing capacitor $C_T$ is reduced, the oscillator frequency $f_{osc}$ of the PWM controller 22 and the maximum duty cycle of the switch device 12 of the switching power supply which is dependent on the pulse width of the PWM signal of the PWM controller 22 are increased accordingly, and further the maximum output power of the switching power supply which is directly proportional to the oscillator frequency $f_{osc}$ of the PWM controller 22 can be boosted up efficiently.

Figure 1:
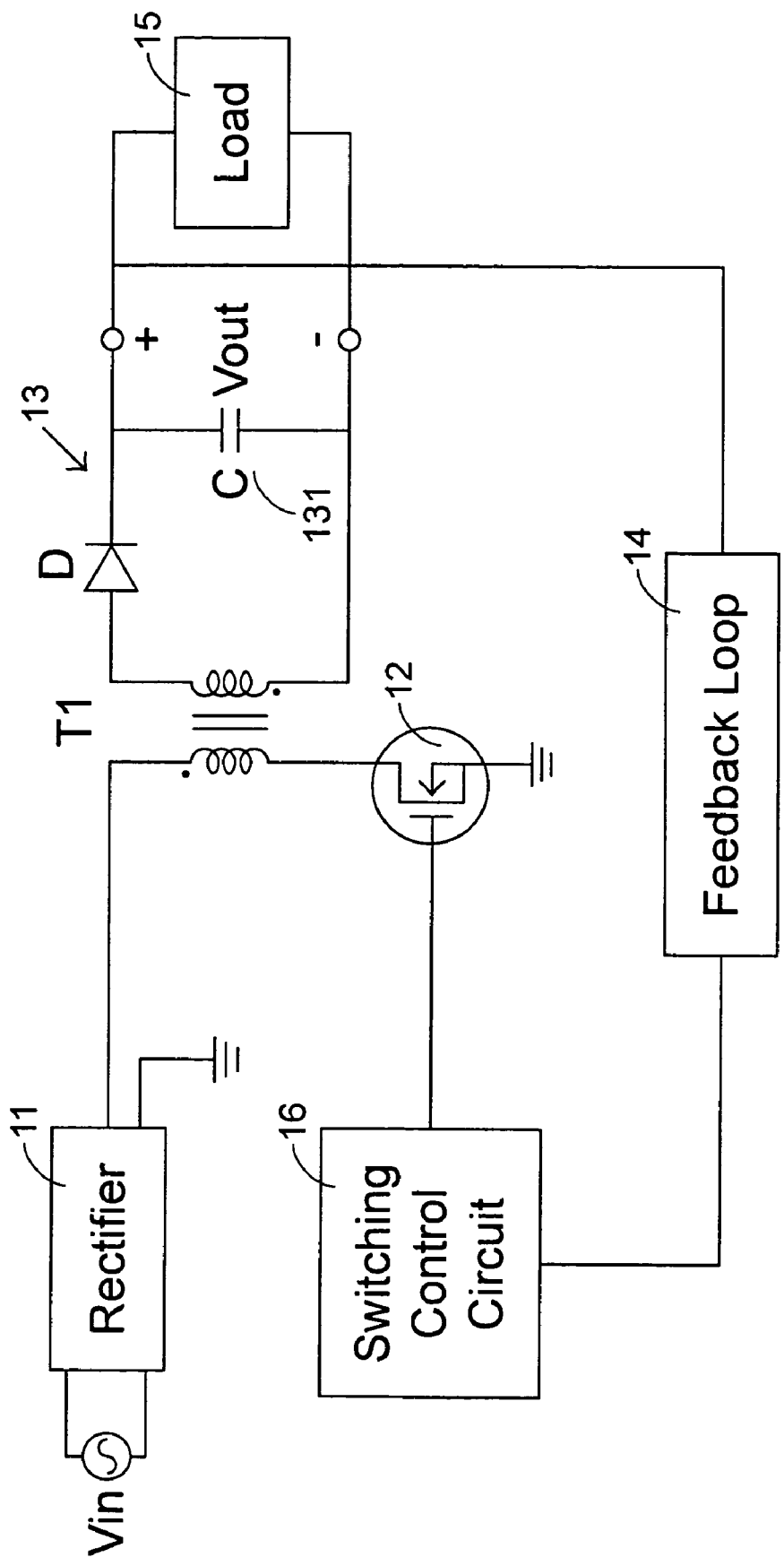
FIG. 1 is a systematic block diagram of a conventional switching power supply.
Figure 3:
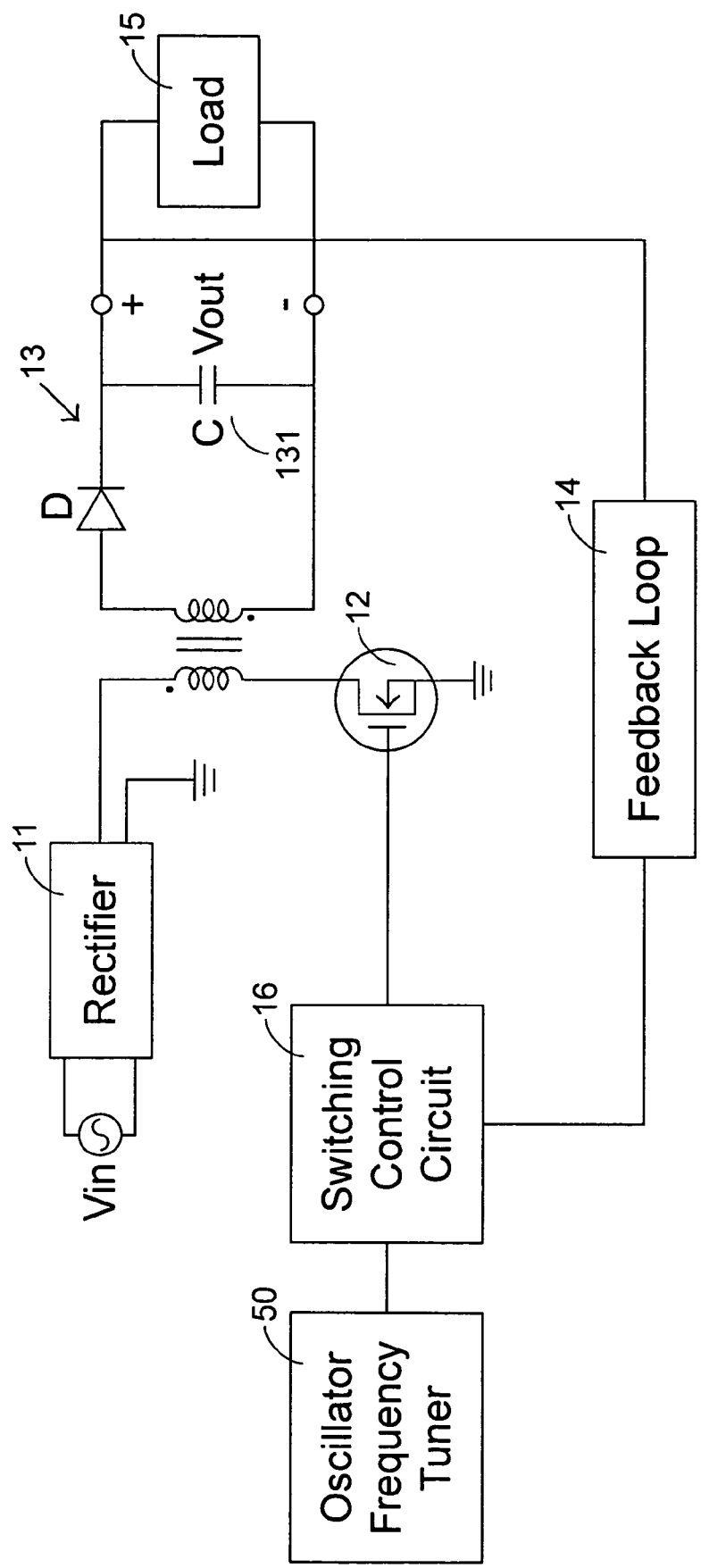
FIG. 3 is a systematic block diagram of a switching power supply according to an exemplary embodiment of the present invention.

Based on the above conception, a switching power supply incorporating an oscillator frequency tuner for broadening the maximum output power of the switching power supply and enhancing the load driving capability of the switching power supply can be derived. An exemplificative topology of the switching power supply according to an exemplary embodiment of the present invention is shown in FIG. 3. In the switching power supply of FIG. 3, its constituent components are almost the same with the constituent components of FIG. 1, and both share similar labeling convention and reference numeral numbering. Therefore, their electrical characteristics, configurations as well as operations will not be dwelled in a greater detail. However, the switching power supply of the present invention incorporates an oscillator frequency tuner 50 being coupled to the switching control circuit 16. The configuration and operation of the oscillator frequency tuner 50 will be described in the following with reference to FIG. 4.

Figure 4:
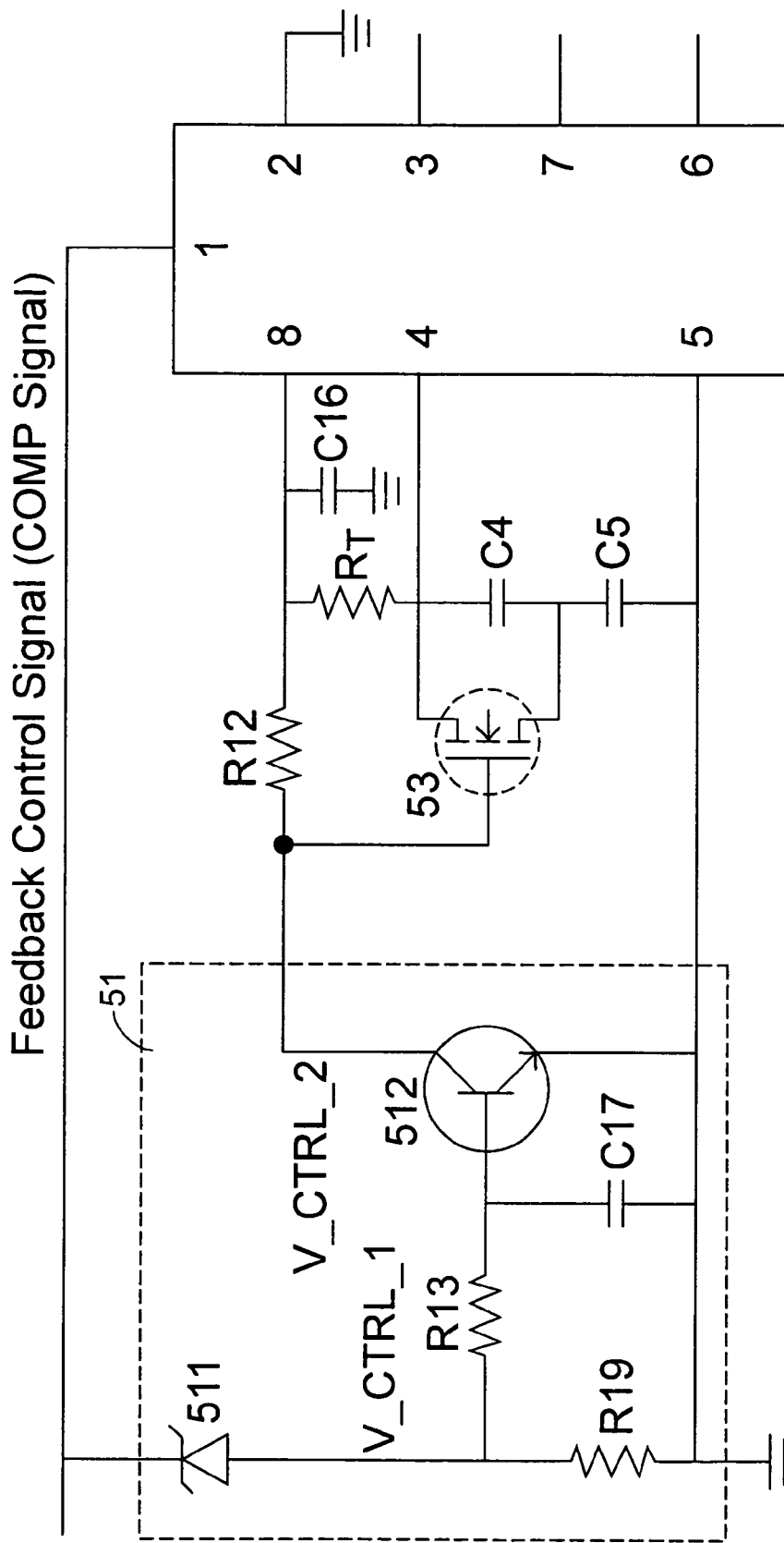
FIG. 4 is a circuit diagram illustrating a switching control circuit and an oscillator frequency tuner being integrated into the switching power supply according to an exemplary embodiment of the present invention.

Referring to FIG. 4, an oscillator frequency tuner 50 and a switching control circuit 16 are illustrated. The oscillator frequency tuner 50 is coupled to the switching control circuit 16 and includes a first oscillating capacitor $C_4$, a second oscillating capacitor $C_5$, a bypass switch 53 and a bypass switch controller 51. The bypass switch 53 may be accomplished by a MOSFET, and the first oscillating capacitor $C_4$ and the second oscillating capacitor $C_5$ are connected in series and are coupled between a reference output of the switching control circuit 16 (the fourth pin of the switching control circuit 16) and ground. In the exemplary embodiment, both the first oscillating capacitor $C_4$ and the second oscillating capacitor $C_5$ have the same capacitance. The bypass switch 53 is connected across the first oscillating capacitor $C_4$, while the bypass switch controller 51 is connected between the switching control circuit 16 and the bypass switch 53. The bypass switch controller 51 is comprised of a first semiconductor device 511, for example, a zener diode that is coupled to the switching control circuit 16, and a second semiconductor device 512, for example, a bipolar junction transistor that is coupled between the first semiconductor device 511 and the bypass switch 53. The first semiconductor device 511 is used to receive a feedback control signal (COMP signal) from the switching control circuit 16 and issues a first voltage control signal V_CTRL_1 in response to the feedback control signal (COMP signal). The feedback control signal (COMP signal) is the output of an error amplifier of the switching control circuit 16 which compares a feedback signal with a reference signal. Hence, the feedback control signal is an indication that determines whether the output power of the switching power supply is above a threshold value. Further, the second semiconductor device 512 is used to issue a second voltage control signal V_CTRL_2 in response to the first voltage control signal V_CTRL_1. The on/off operation of the bypass switch 53 is controlled by the second voltage control signal V_CTRL_2.

Next, the oscillator frequency tuning process carried out by the oscillator frequency tuner 50 is given below.

Under normal operation, that is, during a light load condition or a maximum load condition, the signal state of the feedback control signal (COMP signal) is below the breakdown voltage of the zener diode 511. Hence, the first voltage control signal V_CTRL_1 is driven low and the bipolar junction transistor 512 is off. The second drive signal V_CTRL_2 is then driven high and the bypass switch 53 is turned on. Thus, current is bypassed to the bypass switch 53 and the equivalent timing capacitor is the second oscillating capacitor $C_5$. Assume that both the first timing capacitor $C_4$ and the second timing capacitor $C_5$ has a capacitance of 0.022 μF, the resulting oscillator frequency is 65 KHz. When the peak load condition occurs, the signal state of the feedback control signal (COMP signal) is driven to set above the breakdown voltage of the zener diode 511, causing the zener diode 511 to break down, so that the first voltage control signal V_CTRL_1 is driven high and the bipolar junction transistor 512 starts to conduct current. The second voltage control signal V_CTRL_2 is driven low and the bypass switch 53 is turned off. In this manner, the equivalent timing capacitor is the serial combination of the first oscillating capacitor $C_4$ and the second oscillating capacitor $C_5$. The equivalent timing capacitance will be reduced to half and the oscillator frequency will be doubled according to the formula listed above. Therefore, the oscillator frequency and the duty cycle of the switching control circuit 16 are doubled as well, which in turn broadens the maximum output power and load driving capability of the switching power supply.

The above circuit configuration of the oscillator frequency tuner is used for illustrative purpose only, and is taken as an example to explicate the viability of the oscillator frequency doubling mechanism. However, it is not limiting. For example, if an oscillator frequency tripler is desired, it can be done by serially adding a third capacitor having the same capacitance with the other capacitors and adding a second bypass switch across the second capacitor C5, and applying the second voltage control signal V_CTRL_2 to the gates of both the first bypass switch 53 and the second bypass switch. As the peak load condition occurs, the first and second bypass switches are all turned off due to the state transitions of the first voltage control signal V_CTRL_1 and the second voltage control signal V_CTRL_2. Thus, the equivalent oscillating timing capacitance will become one-thirds of the original oscillating timing capacitance, and the oscillator frequency and the maximum duty cycle of the switching control circuit 16 will be tripled accordingly.

The inventive switching power supply and the oscillator frequency tuner thereof have been described without omission. FIGS. 5(*a*) to 5(*c*) and FIGS. 6(*a*) to 6(*c*) show some test result data that can facilitate the person having ordinary skill in the art to realize the advantages of the present invention. As shown in FIGS. 5(*a*) to 5(*c*), the test result data of a conventional switching power supply without an oscillator frequency tuner is listed. As shown in FIGS. 6(*a*) to 6(*c*), the test result data of a switching power supply with an oscillator frequency tuner of the present invention being incorporated therein is listed. As can be understood by the comparison among the test result data of FIGS. 5(*a*) to (5(*c*) and FIGS. 6(*a*) to 6(*c*), the inventive oscillator frequency tuner is obviously capable of enhancing the load driving capability of the switching power supply and maintaining a good voltage regulation efficiency under peak load condition.

It is readily understood that the present invention can substantially eliminate the problems of limited duty cycle and insufficient load driving capability encountered by the prior art switching power supply. The mechanism used by the present invention to solve these problems is achieved by attaching an oscillator frequency tuner to the switching control circuit, wherein oscillator frequency tuner is achieved by serially connecting a plurality of capacitors and connecting at least one bypass switch with one of the serially-connected capacitors in parallel to control the charging and discharging operations of the capacitor connected thereto. In this way, the resulting capacitance of the oscillating timing capacitor will become a fraction of the capacitance of the original timing capacitance, and the oscillator frequency and maximum duty cycle of the switching control circuit can be progressed in multiplicity. Therefore, the loading driving capability of the switching power supply under peak load condition is enhanced significantly. Even the inventive switching power supply is required to cooperate with a heavy load device, it can provide sufficient load driving capability to operate the load device as well.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A switching power supply, comprising
a rectifier which receives an input voltage and converts the input voltage into a rectified DC voltage;
a switch device connected to the rectifier;
a transformer connected to the switch device for transducing the rectified DC voltage into a magnetization energy by a primary winding and transferring the magnetization energy across a secondary winding according to on/off operations of the switch device;
a switching control circuit which generates a switching control signal to regulate a duty cycle of the switch device; and
an oscillator frequency tuner that modulates an oscillator frequency of the switching control circuit according to a feedback control signal provided by the switching control circuit to broaden a maximum duty cycle of the switching control circuit wherein the oscillator frequency tuner includes a plurality of capacitors connected between a reference voltage output of the switching control circuit and a ground terminal, and at least one bypass switch coupled across at least one of the plurality of capacitor for controlling the charging and discharging operation of the capacitor coupled therewith when the switching power supply is operating under a peak load condition.

2. The switching power supply according to claim 1 further comprising an output circuit coupled to the secondary winding for providing a DC voltage to a load.

3. The switching power supply according to claim 2 further comprising a feedback loop coupled between the output voltage of the switching power supply and the switching control circuit for providing a feedback signal to the switching control circuit and measuring a current flowing through the load.

4. The switching power supply according to claim 1 wherein the plurality of capacitors are connected in series with each other.

5. The switching power supply according to claim 1 wherein the bypass switch is a MOSFET.

6. The switching power supply according to claim 1 wherein the oscillator frequency tuner further comprising a bypass switch controller for controlling a switching state of the bypass switch.

7. The switching power supply according to claim 6 wherein the bypass switch controller further comprising:
- a first semiconductor device coupled to the switching control circuit for receiving a feedback control signal therefrom and providing a first voltage control signal in response to the feedback control signal; and
- a second semiconductor device coupled between the first semiconductor device and the bypass switch for receiving the first voltage control signal and providing a second voltage control signal in response to the first voltage control signal to control the on/off operation of the bypass switch.

8. The switching power supply according to claim 7 wherein the first semiconductor device is a zener diode and the second semiconductor device is a bipolar junction transistor.

9. An oscillator frequency tuner coupled to a switching control circuit of a switching power supply for enhancing a load driving capability of the switching power supply, comprising:
- a plurality of capacitors connected between a reference voltage output of the switching control circuit and a ground terminal; and
- at least one bypass switch coupled across at least one of the plurality of capacitors for controlling the charging and discharging operation of the capacitor coupled therewith.

10. The oscillator frequency tuner according to claim 9 wherein the plurality of capacitors are connected in series with each other.

11. The oscillator frequency tuner according to claim 9 wherein the bypass switch is a MOSFET.

12. The oscillator frequency tuner according to claim 9 further comprising a bypass switch controller for controlling a switching state of the bypass switch.

13. The oscillator frequency tuner according to claim 12 wherein the bypass switch controller further comprising:
- a first semiconductor device coupled to the switching control circuit for receiving a feedback control signal therefrom and providing a first voltage control signal in response to the feedback control signal; and
- a second semiconductor device coupled between the first semiconductor device and the bypass switch for receiving the first voltage control signal and providing a second voltage control signal in response to the first voltage control signal to control the on/off operation of the bypass switch.

14. The oscillator frequency tuner according to claim 13 wherein the first semiconductor device is a zener diode and the second semiconductor device is a bipolar junction transistor.

* * * * *